(12) United States Patent
Penet et al.

(10) Patent No.: US 8,011,919 B2
(45) Date of Patent: Sep. 6, 2011

(54) MOULD BASE FOR MOULDS FOR MANUFACTURING THERMOPLASTIC CONTAINERS AND MOULDING DEVICE EQUIPPED WITH AT LEAST ONE MOULD EQUIPPED WITH SUCH A BASE

(75) Inventors: Laurent Penet, Octeville-sur-Mer (FR); Sylvain Meillerais, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 448 days.

(21) Appl. No.: 12/279,679

(22) PCT Filed: Feb. 6, 2007

(86) PCT No.: PCT/FR2007/000215
§ 371 (c)(1),
(2), (4) Date: Aug. 15, 2008

(87) PCT Pub. No.: WO2007/093686
PCT Pub. Date: Aug. 23, 2007

(65) Prior Publication Data
US 2009/0020682 A1    Jan. 22, 2009

(30) Foreign Application Priority Data

Feb. 16, 2006   (FR) ..................................... 06 01382

(51) Int. Cl.
*B29C 49/48* (2006.01)
(52) U.S. Cl. ....................................................... 425/522
(58) Field of Classification Search .................. 425/522, 425/525; 215/373; 220/606
See application file for complete search history.

(56) References Cited

U.S. PATENT DOCUMENTS

| 5,133,468 A | 7/1992 | Brunson et al. |
| 5,205,434 A | 4/1993 | Brunson et al. |
| 5,353,954 A * | 10/1994 | Steward et al. ............... 220/608 |
| 5,713,480 A * | 2/1998 | Petre et al. .................... 215/373 |
| 5,804,016 A | 9/1998 | Schmidt et al. |
| 6,276,546 B1 | 8/2001 | Davis et al. |

FOREIGN PATENT DOCUMENTS

| EP | 0 346 858 A2 | 12/1989 |
| EP | 0 551 788 A1 | 7/1993 |
| EP | 0 574 342 A1 | 12/1993 |
| WO | 98/28193 A1 | 7/1998 |

* cited by examiner

*Primary Examiner* — Robert B Davis
(74) *Attorney, Agent, or Firm* — Sughrue Mion, PLLC

(57) ABSTRACT

The invention relates to a mold base (1) for a mold that is used for the blow molding or stretch-blow molding of thermoplastic containers (2) having a petaloid-shaped base. The mold base (1) includes several cavities (11) separated by radiating ridges (13) with concave crests (14), the bases (15) of the cavities (11) being distributed along a circular contour. As seen radially on either side of the deepest point thereof, each cavity (11) is defined towards the exterior by a curved surface portion (18) having a circular arc radial cross-section and towards the interior by a broken-plane surface portion (19) with at least two slopes that intersect the curved surface portion (18) at a straight edge (20). The plane (T) which contains the aforementioned edge (2) and which is tangent to the curved surface portion (18) is perpendicular to the axis (12) of the mold base. Moreover, the portion of plane (21) adjacent to the curved surface portion (18) has a slope (a) of between 12° and 8° in relation to the tangent plane (T).

12 Claims, 2 Drawing Sheets

MOULD BASE FOR MOULDS FOR MANUFACTURING THERMOPLASTIC CONTAINERS AND MOULDING DEVICE EQUIPPED WITH AT LEAST ONE MOULD EQUIPPED WITH SUCH A BASE

CROSS REFERENCE TO RELATED APPLICATION

This application is a National Stage of International Application No. PCT/FR2007/000215 filed Feb. 6, 2007, claiming priority based on French Patent Application No. 06 01382, filed Feb. 16, 2006, the contents of all of which are incorporated herein by reference in their entirety.

FIELD OF THE INVENTION

The present invention generally relates to the field of the manufacture, by blow moulding or stretch-blow moulding, of containers, in particular bottles, made of thermoplastic material such as PET.

More specifically, the invention relates to improvements made to the construction of a mould base for a mould for manufacturing, by blow moulding or stretch-blow moulding, containers, in particular bottles, made of thermoplastic material such as PET, said containers having a body and having a base of the type known as "petaloid" with several feet which are equidistantly distributed angularly, which extend approximately parallel to the axis of the container and which are separated from each other by radiating valleys with a convex bottom, said mould base having a moulding cavity comprising, for the moulding of said bases of the containers, several cavities which are equidistantly distributed angularly, which extend approximately parallel to the axis of the mould base and which are separated from each other by radiating ridges with a concave crest, the bottoms of said cavities being distributed along a substantially circular contour, each cavity, seen radially on either side of its deepest point, being defined:

- towards the outside by a curved surface portion which, in radial cross-section, is substantially an arc of a circle and
- towards the inside by a plane surface portion in which a plane portion adjacent to the curved surface portion has a slope between 12° and 8° relative to a plane which is tangent to said curved surface portion and is substantially perpendicular to the axis of the moulding cavity.

The term "ridge" is used for a projecting part, extending substantially radially, of the mould base which leads, in the base of the moulded container, to the formation of an above-mentioned "valley".

BACKGROUND OF THE INVENTION

The part of the containers which is mechanically the most fragile is the base. Indeed it is the base which supports the weight of the column of liquid contained in the container and it can lose its shape (in particular sagging of its central part) over a period of time which varies in length depending on the ambient conditions (temperature, humidity, insulation, etc.) of storage of the containers: the containers can then no longer rest on a support in stable manner.

The sagging of the central part of the container base modifies the position and/or the inclination of the walls defining the feet in the direction of the axis of the container. Thus the feet lose their orientation approximately parallel to the axis of the container and, due to the fact that the feet have in radial cross-section a curved contour, their area resting on a support moves about over their surface. The container no longer rests on a plane support in stable manner.

Retailers distributing carbonated liquids packaged in containers made of thermoplastic material such as PET in countries with severe climatic conditions (high temperature, high humidity level) wish to be able to store the containers for a long enough period of time without the containers losing their stability.

Moreover, the container manufacturers wish to be able to satisfy retailers' requests without this resulting in a reduction in the production rate of the containers, or on the contrary if possible even to further increase production rates.

SUMMARY OF THE INVENTION

A precise aim of the invention is to propose an improved technical solution which is adapted for leading to the sought objectives in terms of improvement in the stability over time of the bases of the containers stored, filled under pressure, in a warm and humid atmosphere, without affecting the production rate.

To these ends, according to a first of its aspects the invention provides a mould base for a mould for manufacturing, by blow moulding or stretch-blow moulding, containers, in particular bottles, made of thermoplastic material such as PET, as mentioned in the preamble, which mould base is characterized, being arranged according to the invention, in that the surface portion is a broken plane surface portion with at least two slopes and intersects said curved surface portion at a straight edge which extends substantially circumferentially and is contained in said plane.

Due to this arrangement, the straight edge thus formed at the base of the cavities leads to the formation, for each foot of the container base, of a projecting supporting ridge extending substantially circumferentially. This ridge remains the support contact of the foot on a plane support irrespective of the deformation and/or the inclination to which the foot is subjected under the effect of sagging of the central part of the container base.

The slope of the plane portion adjacent to the curved surface portion must be chosen with care, as, if this slope is too steep, the moulding of the container base proves difficult, whereas if on the contrary this slope is too gentle, the centre of the container base is not raised sufficiently relative to the ends of the feet such that the stability of the container is rapidly lost. A slope comprised within the mentioned range between approximately 12° and 8° seems to have to be generally satisfactory, a preferred solution being a slope of approximately 10°.

In an embodiment which is preferred because being simple to implement, the broken-plane surface portion has with a double slope. Advantageously then, the slope of the plane portion situated towards the inside of the base of the moulding cavity is between approximately 17° and 23°, preferably between approximately 20° and 21°, typically approximately 20.5°.

According to a second of its aspects, the invention also proposes a moulding device for manufacturing, by blow moulding or stretch-blow moulding, containers, in particular bottles, made of thermoplastic material such as PET, said containers having a body and having a base of the type known as "petaloid" with several feet which are equidistantly distributed angularly, which extend approximately parallel to the axis of the container and which are separated from each other by radiating valleys with convex bottoms, which moulding device comprises at least one mould made up of at least three parts including a mould base having a moulding cavity comprising, for the moulding of said bases of the containers, several cavities which are equidistantly distributed angularly, which extend approximately parallel to the axis of the mould base and which are separated from each other by radiating ridges with concave crests, the bottoms of said cavities being distributed along a substantially circular contour, which moulding device, being arranged according to the invention, is characterized in that the mould base is arranged according to the invention as explained above. A significant application of the arrangements of the invention relates to carousel-type rotary blow-moulding or stretch-blow moulding machines equipped with a multiplicity of moulds having respective bases arranged according to the invention.

BRIEF DESCRIPTION OF THE DRAWINGS

The invention will be better understood on reading the following detailed description of certain of its preferred embodiments given as purely illustrative examples. In this description, reference will be made to the attached drawing in which.

DETAILED DESCRIPTION OF THE INVENTION

Now referring to FIGS. 1 to 4, a mould base 1 is shown intended for equipping a mould for manufacturing, by blow moulding or stretch-blow moulding, containers, in particular bottles, made of thermoplastic material such as PET.

Figure 5:
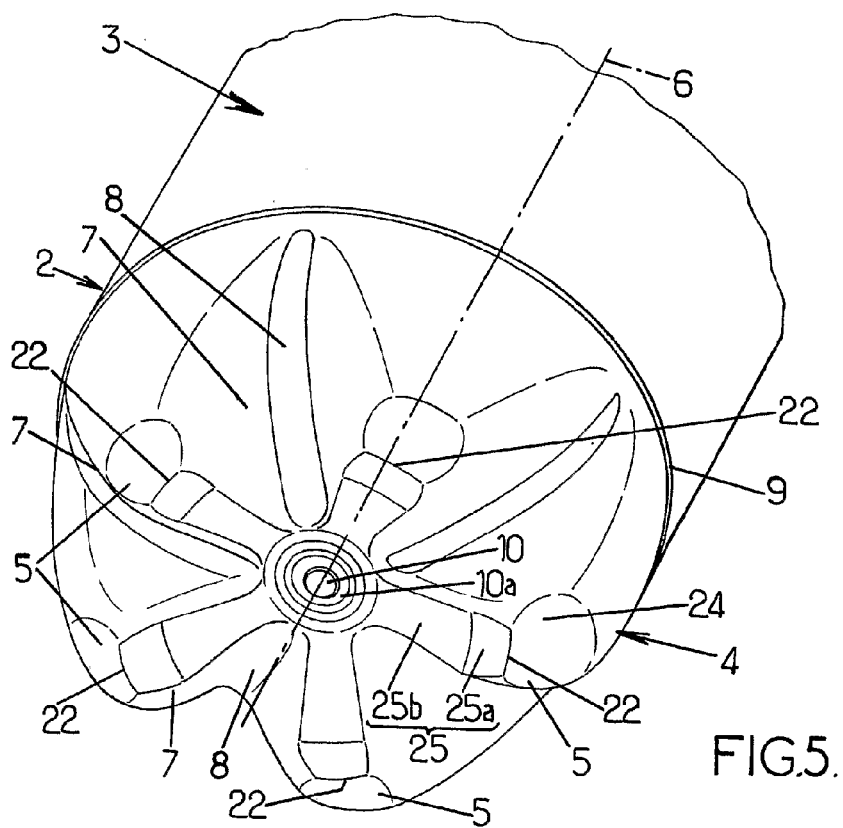
FIG. 5 is an isometric perspective view from below of three quarters of the base of a moulded container with a mould base arranged according to FIGS. 1 to 4.

As shown in FIG. 5, the containers 2 to be manufactured with this mould have a body 3 and have a base 4 of the type known as "petaloid" having a plurality of protuberances forming feet 5, generally of a number comprised between three and seven, in practice between four and six (five in the example illustrated), which are equidistantly distributed angularly, which extend approximately parallel to the axis 6 of the container and which are separated from each other by radiating valleys 7 with curved convex bottoms 8. All of the valleys 7 converge in the direction of the centre of the base which is designed in the form of a hollow indentation 10a with a circular contour in the centre of which is located a protuberance in the form of a circular plateau 10 projecting outwards. The base 4 of the container is connected to the body 3 of the container by a connection zone 9 substantially around a cylinder.

The mould base 1 is provided with a moulding cavity C which comprises, for the moulding of said bases 4 of the containers 2, a plurality of cavities 11 equal in number to the number of the feet 5 of the bases 4 of the containers, in general comprised between three and seven, in practice between four and six (five in the example illustrated in FIGS. 1 to 4), which are equidistantly distributed angularly (mutual angular spacing of 72° in this example), which extend approximately parallel to the axis 12 of the mould base 1 (which is also the axis of the moulding cavity C) and which are separated from each other by radiating ridges 13 (i.e. projecting parts, extending substantially radially from the moulding cavity C which lead, in the base 4 of the moulded container, to the formation of said valleys 7).

Each ridge 13 has a concave curved crest 14, which is in the form of an arc of a circle springing from the edge of the central indentation 10a.

The bottoms 15 of the cavities 11 are distributed along a substantially circular contour 16 having a given base diameter D, this diameter corresponding to the diameter of the seat of the base 4 of the containers (diameter of the circular contour along which the zones of the feet 5 by which the containers rest on a plane support are distributed).

The centre of the moulding cavity C comprises a projecting central table 17a at the centre of which a shallow circular depression 17 is hollowed out, in order to form said indentation 10a and plateau 10 of the container base 4.

Figure 1:
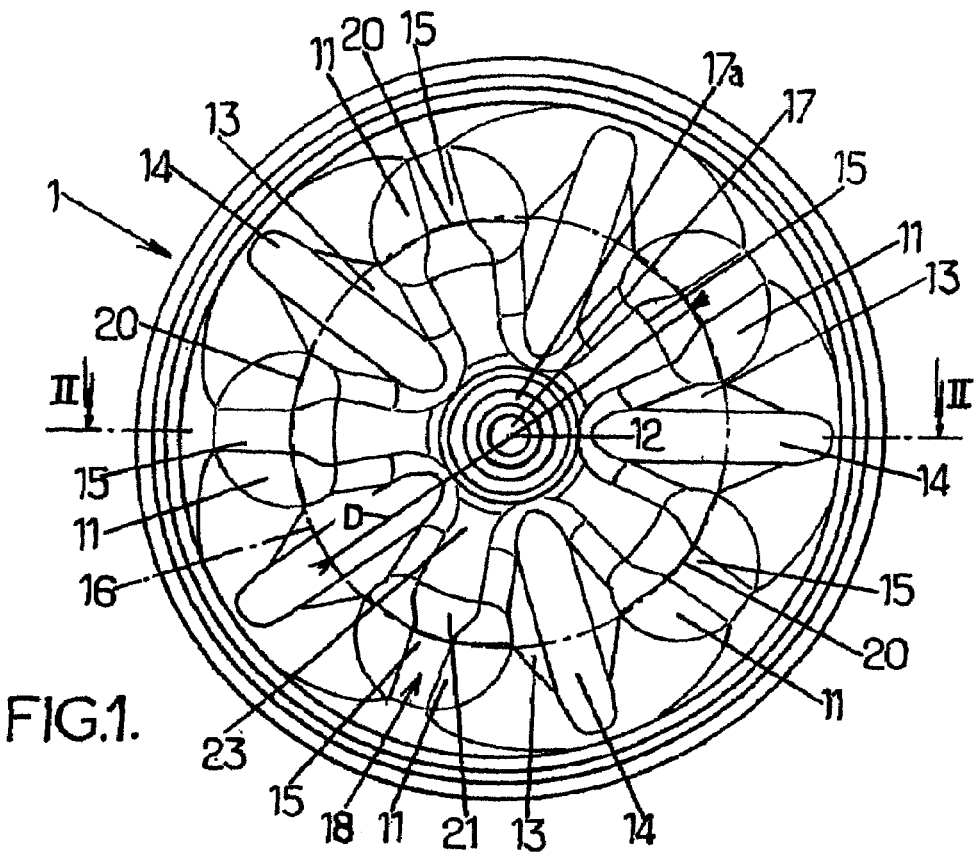
FIG. 1 is a top view of a mould base arranged according to the invention.
Figure 2:
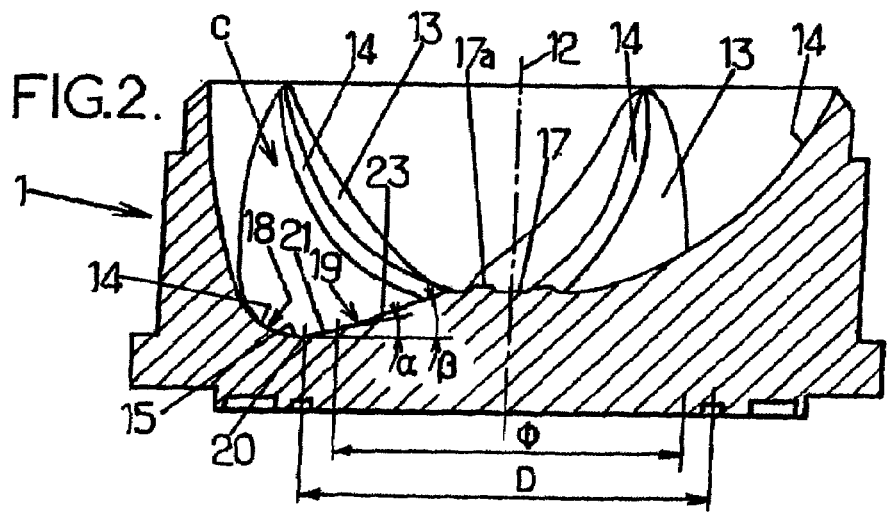
FIG. 2 is a diametral cross-sectional view along the line II-II of the mould base in FIG. 1.
Figure 3:
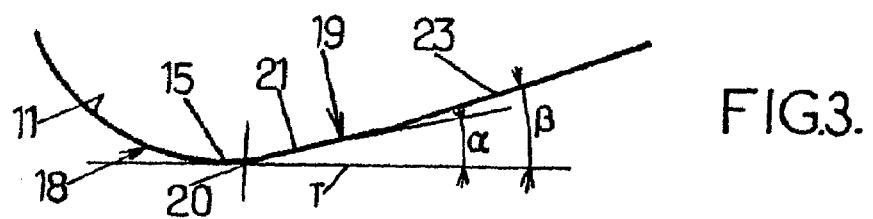
FIG. 3 is a partial view on an enlarged scale of part of the contour of the moulding cavity of the mould base in FIG. 2.
Figure 4:
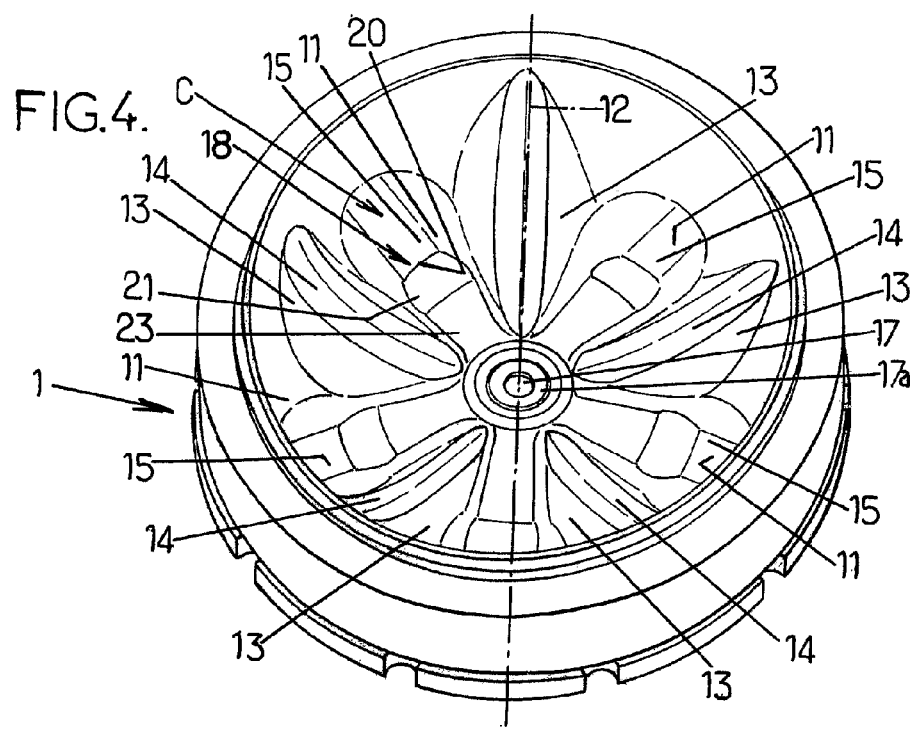
FIG. 4 is a perspective view of three quarters of the mould base in FIG. 1 from above.

Each cavity 11, seen radially on either side of its deepest point, is defined, as can be seen better in the cross-sectional view in FIG. 2 and still better in the partial cross-sectional view on an enlarged scale in FIG. 3:

towards the outside by a curved surface portion 18 which, in radial cross-section, is substantially an arc of a circle and towards the inside by a plane surface portion 19 in which a plane portion 21 which is adjacent to the curved surface portion 18 has a slope $\alpha$ between 12° and 8°, preferably approximately 10°, relative to said plane T tangent to said curved surface portion 18 and is substantially perpendicular to the axis 12 of the moulding cavity C.

According to the invention, the surface portion 19 is a broken-plane portion with at least two slopes and intersects said curved surface portion 18 at a straight edge 20 extending substantially circumferentially and contained in the plane T.

This arrangement of the mould leads to the formation, on each foot 5 of the container base 4, of a supporting projecting ridge 22 by which the foot rests on a plane support. This support, rigidified by the ridge shape, is provided irrespective of the deformation and/or the inclination of the foot under the effect of sagging of the container base over time. Thus, in the presence of sagging of the base of the container, the container retains a stable footing on a plane support.

The slope of the plane portion 21 which is adjacent to the curved surface portion 18 is, within said range, sufficient for the centre of the container base 4 to be correctly raised relative to the projecting support ridges 22 of the feet 5, while allowing easy moulding during the blow-moulding process.

In the preferred embodiment illustrated in the attached figures, the broken-plane surface portion 19 has at least a double slope which makes it possible to achieve the result sought as regards improvement of the stability of the container over time whilst avoiding a complexity of the shape of the container base prejudicial to easy moulding. Under these conditions, provision is made for the slope $\beta$ of the plane portion 23 situated towards the inside of the base of the moulding cavity C to be between approximately 17° and 23°, preferably between approximately 20° and 21°, typically approximately 20.5°.

The ridges formed by the intersection of the two plane portions 21 and 23 are situated along a circular contour having a diameter $\Phi$ of approximately 55 mm in the typical example where said two plane portions have respective slopes of approximately 10° and 20.5°.

Under these conditions, as is visible in FIG. 5 each foot 5 of the container base 4 is defined, on either side of the projecting support ridge 22, by a curved outer wall 24 (moulded in contact with said curved surface portion 18 of the moulding cavity C of the mould base 1) and by an internal wall 25 with a double slope, respectively 25a and 25b (moulded in contact with the broken-plane surface portion 19 with an abovementioned double slope of the moulding cavity C of the mould base 1).

The arrangements according to the invention have a particularly preferred application in a moulding device for manufacturing, by blow moulding or stretch-blow moulding, containers 2, in particular bottles, made of thermoplastic material such as PET, said containers 2 having a body 3 and having a base 4 of the type known as "petaloid" with several feet 5 which are equidistantly distributed angularly, which extend approximately parallel to the axis 6 of the container and which are separated from each other by radiating valleys 7 with convex bottoms 8, which moulding device comprises at least one mould made up of at least three parts including a mould base 1 comprising, for the moulding of said bases 4 of the containers, several cavities 11 which are equidistantly distributed angularly, which extend approximately parallel to the axis 12 of the mould base 1 and which are separated from each other by radiating ridges 13 with concave crests 14, the bottoms 15 of said cavities 11 being distributed along a substantially circular contour having a given base diameter D, the mould base 1 of said at least one mould of the moulding device then being arranged with one and/or the other of the arrangements disclosed above. In particular such a moulding device can in practice be in the form of a carousel-type rotary blow-moulding or stretch-blow-moulding machine equipped with a plurality of moulds having respective bases arranged according to the invention.

By means of the particular arrangements proposed by the invention, it becomes possible to manufacture containers, in particular bottles, made of thermoplastic material such as PET, which, despite the sagging of their base, have increased stability over time, in particular in an atmosphere which is aggressive to thermoplastic material (high temperature, humidity).

The invention claimed is:

1. Mould base for a mould for manufacturing, by blow moulding or stretch-blow moulding, containers made of thermoplastic material, said containers having a body and having a base of the type known as petaloid with several feet which are equidistantly distributed angularly, which extend approximately parallel to the axis of the container and which are separated from each other by radiating valleys with convex bottoms, said mould base having a moulding cavity comprising, for the moulding of said bases of the containers, several cavities which are equidistantly distributed, which extend approximately parallel to the axis of the mould base and which are separated from each other by radiating ridges with a concave crest, the bottoms of said cavities being distributed along a substantially circular contour, each cavity, seen radially on either side of its deepest point, being defined:

towards the outside by a curved surface portion which, in radial cross-section, is substantially an arc of a circle and
towards the inside by a plane surface portion in which a plane portion adjacent to the curved surface portion has a slope between 12° and 8° relative to a plane which is tangent to said curved surface portion and is substantially perpendicular to the axis of the moulding cavity, wherein the surface portion is a broken-plane surface portion with at least two slopes;

a first slope, the slope of the plane portion adjacent to the curved surface portion;
a second slope, the slope of the plane portion situated towards the inside of the base of the moulding cavity and that is between approximately 17° and 23°, and intersects said curved surface portion at a straight edge extending substantially circumferentially and contained in said plane, whereby the straight edge thus formed at the bottoms of the cavities leads to the formation, for each foot of the container base, of a projecting support ridge extending substantially circumferentially.

2. Mould base according to claim 1, wherein the first slope is approximately 10°.

3. Mould base according to claim 1, wherein the broken-plane surface portion has a double slope.

4. Mould base according to claim 1, wherein the second slope is between approximately 20° and 21°.

5. Moulding device for manufacturing, by blow moulding or stretch-blow moulding, containers, made of thermoplastic material, said containers having a body and having a base of the type known as petaloid with several feet which are equidistantly distributed angularly, which extend approximately parallel to the axis of the container and which are separated from each other by radiating valleys with convex bottoms, which moulding device comprises at least one mould made up of at least three parts including a mould base having a moulding cavity comprising, for the moulding of said bases of the containers, several cavities which are equidistantly distributed angularly, which extend approximately parallel to the axis of the mould base and which are separated from each other by radiating ridges with concave crests, the bottoms of said cavities being distributed along a substantially circular contour, wherein the mould base is arranged according to claim 1.

6. Mould base according to claim 1, wherein the containers are bottles.

7. Mould base according to claim 1, wherein the thermoplastic material is PET.

8. Mould device according to claim 5, wherein the containers are bottles.

9. Mould device according to claim 5, wherein the thermoplastic material is PET.

10. A mould base for a mould for manufacturing, by blow moulding or stretch-blow moulding, containers made of thermoplastic material, the containers having a body and having a petaloid base with several feet distributed angularly and that extend approximately parallel to the axis of the container and are separated from each other by radiating valleys with convex bottoms, the mould base comprising:

a moulding cavity for the moulding of the bases of the containers, comprising cavities that are angularly distributed, that extend approximately parallel to a vertical central axis of the mould base, and that are separated from each other by radiating ridges with a concave crest;
the bottoms of the cavities are distributed along a substantially circular contour, each cavity, seen radially on either side of its deepest point, defined:
towards the outside by a curved surface portion that, in radial cross-section, is substantially an arc of a circle, and
towards the inside by a plane surface portion in which a plane portion adjacent to the curved surface portion has a slope between approximately 12° and 8° relative to a plane that is tangent to the curved surface portion and substantially perpendicular to the central axis of the moulding cavity;
the plane surface portion is a broken-plane surface portion comprising at least two slopes, a first slope that is the slope of the plane portion adjacent to the curved surface portion and a second slope that is the slope of the plane portion located further toward the inside of the base of the moulding cavity, the second slope between approximately 17° and 23°;

the plane surface portion intersects the curved surface portion at to form edges positioned substantially circumferentially and contained in the plane surface portion, the edges thus formed at the respective bottoms of the cavities results in the formation, for each foot of the container base, of projecting support ridges positioned substantially circumferentially.

11. The mould base according to claim 10, wherein the first slope is approximately 10°.

12. The mould base according to claim 10, wherein the second slope is between approximately 20° and 21°.

* * * * *